Patented Jan. 25, 1944

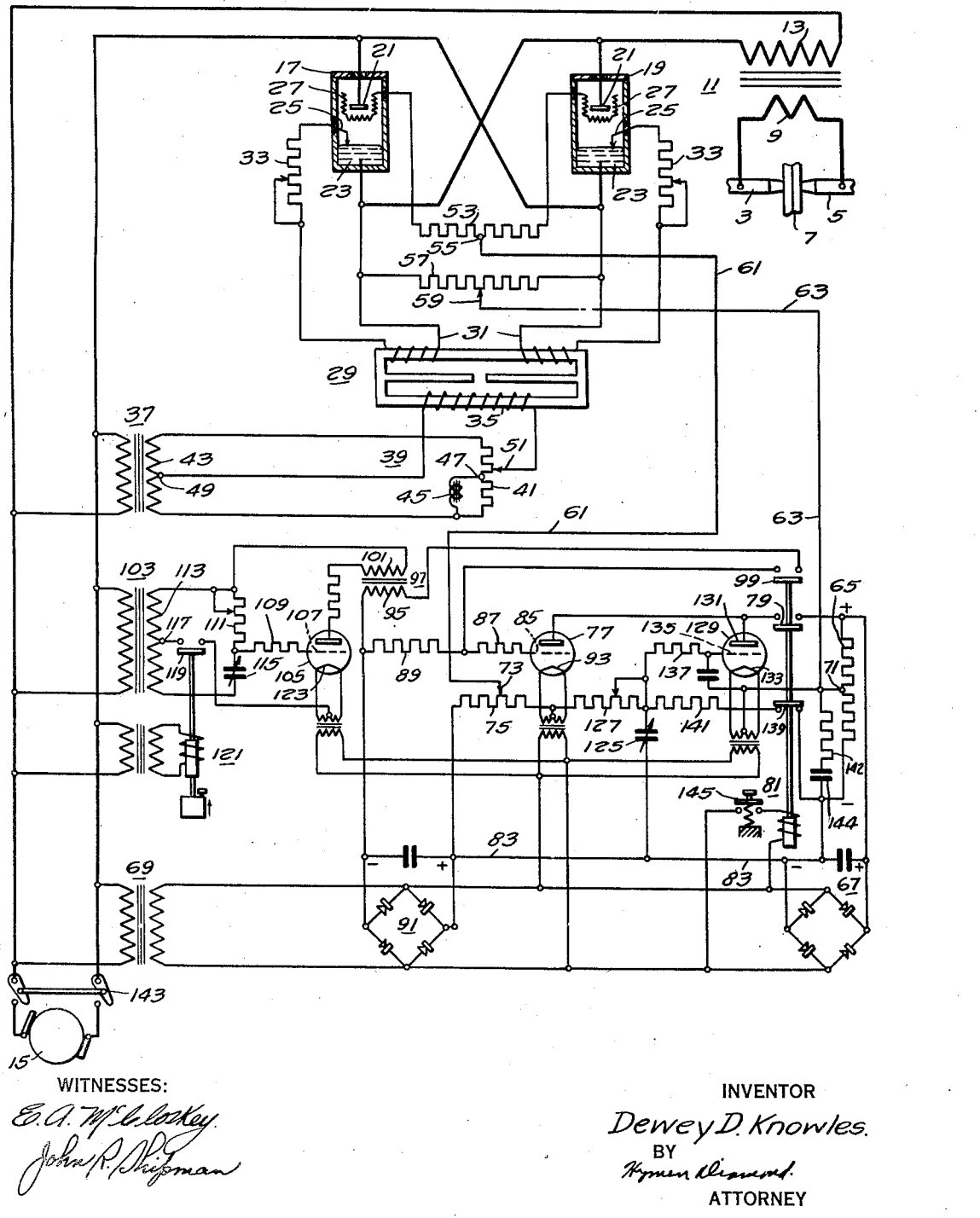

2,340,061

UNITED STATES PATENT OFFICE 2,340,061

ELECTRIC DISCHARGE APPARATUS

Dewey D. Knowles, Verona, N. J., assignor to Westinghouse Electric & Manufacturing Company, East Pittsburgh, Pa., a corporation of Pennsylvania Application August 13, 1941, Serial No. 406,613

6 Claims. (Cl. 250—27)

This invention relates to electric discharge apparatus and has particular relation to apparatus including electric discharge valves of the immersed-igniter type which are commonly designated as ignitrons.

In welding apparatus constructed in accordance with the teachings of the prior art, welding current is supplied from an alternating current source through ignitrons. The ignitrons are inversely connected and are rendered conductive alternately to conduct successive half cycles of the alternating current. Current is supplied through the ignitrons in precisely timed intervals measured in terms of half periods of the source. The magnitude of the energy supplied during any half period is controlled by rendering the corresponding ignitron conductive at a predetermined instant during the half period. To render the ignitrons conducting, an exciting circuit is provided for the igniter of each ignitron and the flow of current therethrough is controlled by a pair of series connected thyratron tubes. One of the thyratrons in each exciting circuit is rendered conductive during each of a preselected number of half periods of the source to determine the length of the welding interval. The other thyratron in each exciting circuit is rendered conductive at a predetermined instant in each half period. When both thyratrons in an exciting circuit are conductive simultaneously, current flows through the circuit and if the ignitron has a positive anode-cathode potential, it is rendered conductive. In this manner, each ignitron is rendered conductive at a predetermined instant in each of a preselected number of periods of the source, the ignitron becoming non-conductive when its anode-cathode potential passes through zero.

Although the prior apparatus described above operates satisfactorily, a pair of thyratron tubes and their associated controls must be provided for each ignitron. Consequently, the system is somewhat complicated and rather expensive. The characteristics of a welding operation require accurate and consistent operation of the welding apparatus. In addition, it is desirable for commercial reasons that the apparatus be simple in construction and operation and includes as few elements as possible while maintaining satisfactory operation.

It is accordingly an object of my invention to provide a welding system of simple structure having facilities for controlling both the timing and the heat supplied for welding.

It is a general object of my invention to provide a novel and advantageous arrangement employing an electric discharge valve of the immersed-igniter type for controlling the supply of power to a load.

Another object of my invention is to provide a simple and inexpensive means for controlling the conductivity of an electric discharge valve of the ignitron type.

An additional object of my invention is to provide a novel system for supplying power to a load from a source of periodic potential in which an ignitron is associated with improved means for controlling the conductivity thereof with respect to the periods of the source.

An ancillary object of my invention is to provide a welding system which includes an ignitron for controlling the supply of current to the welding electrodes and simplified means for accurately controlling the conductivity of the ignitron to produce a consistent weld.

More specifically, it is an object of my invention to provide a system for supplying power to a load from a source of periodically pulsating potential which includes an ignitron and improved apparatus for determining the particular periods of the source and the particular instant during each of those periods during which the ignitron is rendered conductive.

In accordance with my invention, I provide a system including a pair of ignitrons, each having an anode, a cathode, an igniter and a control grid. Each ignitron may be rendered conductive, whenever its anode-cathode potential is positive, by the passage of a current impulse through the igniter, provided that the potential between the control grid and cathode has the proper value. Once an ignitron is rendered conductive, it continues to conduct current as long as the anode-cathode potential remains positive.

Each of the ignitrons is connected with its anode and cathode in circuit between the periodic source and the load. The igniter is energized at a predetermined instant during each period of the source by the passage therethrough of a current impulse having a peaked wave form. However, the ignitron is not rendered conductive each time the igniter is energized for a negative biasing potential is originally impressed between its control grid and cathode to maintain it non-conductive. A timing circuit is provided which changes the biasing potential to a value such as to permit the ignitron to conduct throughout a preselected number of periods of the source. Consequently, the ignitron is rendered conductive by the energization of the igniter during each of the preselected periods only. The ignitron is rendered conductive at a particular instant as determined by the application of igniter current during each of a particular number of periods of the source as determined by the application of grid potential and current is supplied to the load at the desired average value over a predetermined interval of time.

The novel features that I consider characteristic of my invention are set forth with particularity in the appended claims. The invention itself, however, both as to its organization and its method of operation, together with additional objects and advantages thereof will best be understood from the following description of a specific embodiment of my invention when read in connection with the accompanying drawing, the single figure of which illustrates the invention as embodied in a welding system.

In the apparatus shown in the drawing, a pair of welding electrodes 3 and 5 engage the material 7 to be welded and are connected to receive current from the secondary 9 of a welding transformer 11. The primary 13 of the welding transformer is supplied from a source of alternating current potential 15 through a pair of inversely connected electric discharge valves 17 and 19. The electric discharge valves 17 and 19 are ignitrons, each having an anode 21, a cathode 23, an igniter 25 and a control grid 27. A peaking transformer 29 having a secondary winding 31 for each ignitron is employed in energizing the igniters 25 of the ignitrons. The exciting circuit for each igniter 25 extends from the cathode 23 of the ignitron through the secondary 31 of the transformer 29 and the variable resistor 33 to the igniter 25. Power is supplied to the primary 35 of the peaking transformer 29 from the source 15 through an auxiliary transformer 37, and a phase shifting circuit 39.

The phase shifting circuit 39 comprises a resistor 41 connected across the secondary 43 of the auxiliary transformer 37 and an inductance 45 connected between the lower end of the resistor 41 and the center tap 47 thereof. The primary 35 of the peaking transformer 29 is connected between the center tap 49 of the secondary 43 of the auxiliary transformer 37 and a variable tap 51 on the resistor 41. Two impedances having different phase angles are provided by the phase shifting circuit. One of these is represented by the portion of the resistor 41 above the center tap 47, and the other is represented by the portion of the resistor 41 below the center tap 47 and the inductance 45 connected across it. Adjustment of the variable tap 51 of the resistor causes the phase angle of the potential impressed on the peaking transformer primary 35 to be varied. Thus, a current impulse passes through the exciting circuit of each igniter at a predetermined instant in each half cycle of the source.

The potential between the control grid 27 and the cathode 23 of each ignitron is controlled by a timing circuit similar to that disclosed in the Dawson Patent 2,189,601, issued on February 6, 1940, and assigned to the Westinghouse Electric & Manufacturing Company. The control grids 27 of the ignitrons 17 and 19 are connected with each other through a resistor 53 having a center tap 55. The cathodes 23 of the ignitrons are connected together through a resistor 57 having a variable intermediate tap 59. A potential is to be impressed between the control grid 27 and cathode 23 of each ignitron through leads 61 and 63 connected to the center tap 55 and the variable tap 59 of the two resistors 53 and 57, respectively.

A voltage divider 65 is connected across the terminals of a direct current source represented by a copper oxide rectifier bridge 67 which is supplied from the alternating current source 15 by means of an auxiliary transformer 69. The voltage divider 65 has an intermediate tap 71 which is connected through the lead 63 to the variable tap 59 on the resistor 57 connecting the cathodes 23 of the ignitrons. The center tap 55 of the resistor 53 connecting the control grids 27 is connected by lead 61 to a variable tap 73 on a resistor 75. The resistor 75, in turn, is connected to the positive terminal of the voltage divider 65 through a thyratron tube 77 and contactor 79 of the current relay 81 and to the negative terminal by lead 83. The contactor 79 of the current relay 81 is originally open and, therefore, the variable tap 73 on the resistor 75 is negative with respect to the intermediate tap 71 on the voltage divider 65. Thus, the control grid-cathode potential of each ignitron is normally negative, preventing the ignitron from being rendered conductive by the current impulses passing through the igniter.

The thyratron tube 77 in series with the resistor 75 connected across the voltage divider 65, may be called a "start" tube. The control circuit of the start tube 77 extends from its grid 85 through a grid resistor 87, an auxiliary resistor 89 to the negative terminal of a rectifier bridge 91 supplied from the alternating current source 15 through the auxiliary transformer 69. From the positive terminal of the rectifier 91, the control circuit continues through the resistor 75 to the cathode 93 of the start tube. It is apparent that the rectifier 91 places a negative bias on the start tube 77 preventing it from becoming conductive.

The secondary 95 of an impulse transformer 97 is connected across the auxiliary resistor 89 in the control circuit of the start tube through an originally open contactor 99 of the current relay 81. The primary 101 of the transformer 97 is supplied with power from the alternating current source 15 through the auxiliary transformer 103 and a thyratron tube 105. The control circuit of the thyratron tube 105 extends from the grid 107 through a grid resistor 109 and through the parallel circuit comprising a variable resistor 111 and the upper portion of the secondary 113 of the auxiliary transformer 103 on one side, and the variable capacitor 115 and the lower portion of the secondary 113 on the other side. From the center tap 117 of the secondary 113, the control circuit continues through the contactor 119 of a current relay 121 to the cathode 123 of the thyratron tube 105.

The current relay contactor 119 is closed as soon as power is available from the source and remains closed throughout the use of the apparatus. The function of relay 121 is to prevent operation of the system until the cathodes of the tubes have been heated up. The current relay 81 is energized closing contacts 79 and 99 when a welding operation is to take place.

The capacitor 115 and resistor 111 in the control circuit of the thyratron tube 105 are adjusted to render the tube conductive at the instant of the beginning of a period of the source potential. Current then flows through the primary 101 of the impulse transformer 97 and the secondary 95 impresses a potential across the auxiliary resistor 89. This resistor potential is sufficient to overcome the negative bias of the start tube 77 and it is rendered conductive. When the start tube becomes conductive, current flows from the positive side of the voltage divider 65 through the contactor 79 of the current relay 81, the start tube 77, the resistor 75 in circuit therewith and lead 83 to the negative terminal of the divider. The current flowing through the resistor 75 develops a potential thereacross and the variable tap 73 is so positioned that it becomes positive with respect to the intermediate tap 71 of the voltage divider 65. As a result, a positive potential is impressed between the control grid 27 and the cathode 23 of each ignitron. As long as the control grid-cathode potential remains positive, each ignitron is rendered conductive at a predetermined instant during each period of the source by the energization of the igniter.

The length of the interval during which the variable tap 73 of the resistor 75 remains positive with respect to the intermediate tap 71 of the voltage divider 65, is controlled by a variable capacitor 125. The capacitor 125 and a variable resistor 127 in series therewith are connected across the resistor 75. The capacitor 125 is in a discharged condition having been shunted through a resistor 141 under the control of contactor 139 of relay 81. During welding relay 81 is energized and contactor 139 is open. Therefore, charging of the capacitor 125 is initiated when the start tube 77 becomes conductive.

The variable capacitor 125 is also connected in the control circuit of a thyratron tube 129 which may be designated as a stop tube. The anode 131 and cathode 133 of the stop tube 129 are connected between the positive terminal and the intermediate tap 71 of the voltage divider 65 through the contactor 79 of the current relay 81. The control circuit of the stop tube 129 extends from the grid 135 through a grid resistor 137, the variable capacitor 125 to the negative terminal of the voltage divider 65. It continues from the intermediate tap 71 of the divider 65 to the cathode 133 of the stop tube 129. While capacitor 125 is discharged, a negative potential is impressed between the grid 135 and cathode 133 of the stop tube 129 by the lower portion of the voltage divider 65. When the capacitor 125 is charged to a predetermined value by current passing through the start tube 77, the charge of the capacitor 125 overcomes the negative potential provided by the lower portion of divider 65 and renders the stop tube conductive. A circuit is then established from the positive terminal of the voltage divider 65 through the contactor 79 of the current relay 81 and the stop tube 129 to the intermediate tap 71 of the divider 65 and the start tube 77 and resistor 75 are short circuited thereby. As a result the start tube 77 is deionized and becomes non-conductive. The stop tube 129 remains conductive to maintain the start tube 77 non-conductive until the contactor 79 of the current relay 81 opens. Resistor 142 and capacitor 144 are connected to divider 65 to act as filters.

The system is prepared for welding by closing a switch 143 connecting the system to source 15. As a result the tubes are heated and relay 121 is energized. The exciting circuits for the igniters 25 of the ignitrons 17 and 19 are then energized through the phase shifting circuit 39 at a predetermined instant during each half cycle of the source potential. However, the ignitrons 17 and 19 are not rendered conductive because the control grid-cathode potentials are originally negative. To initiate a welding operation, a switch 145, such as a push button, is closed, effecting energization of the current relay 81 from the auxiliary transformer 69. As the contactors 79 and 99 of the relay 81 close, the impulse transformer 97 causes the start tube 77 to be rendered conductive at the beginning of the next period of the potential source 15. When the start tube 77 of the timing circuit is rendered conductive, a positive potential is impressed between the control grids 27 and cathodes 23 of the ignitrons. Consequently, each ignitron is thereafter rendered conductive, whenever the anode-cathode potential is positive, by the energization of the igniters.

Contactor 139 of relay 81 is opened when the relay 81 is energized as switch 145 is closed. Then when the start tube 77 of the timing circuit is rendered conductive, charging of the variable capacitor 125 begins. After a predetermined interval, which may be set by adjusting the capacitor 125, the stop tube 129 is rendered conductive. As the stop tube 129 becomes conductive, the start tube 77 is deionized and the original negative potential is reestablished between the control grid 27 and cathode 23 of the ignitrons 17 and 19.

As previously mentioned, the negative control grid-cathode potential prevents the ignitrons from being rendered conductive by energization of the igniters. To repeat the welding operation, the push button 145 is released and thereafter reclosed. Upon release of the push button, the current relay 81 is deenergized and the lower contactor 139 thereof closes the shunting circuit permitting the variable capacitor 125 to be discharged. The timing circuit is thus reset and if the push button is reclosed, another welding operation takes place.

It is to be noted that the positive potential established between the grid and cathode of each ignition during the preselected welding interval remains at a constant value. A substantially constant value potential is preferred because it insures firing of the ignitron by the energization of the igniter regardless of the particular instant in the half cycle at which energization takes place. Although the timing means illustrated changes or varies the potential between the grid and cathode of each ignitron in the preferred manner from one substantially constant value to another and back again, it is obvious that any timing means may be employed which changes or varies the potential so that it rises at times to a value such that the ignitron is rendered conductive by energization of the igniter, even though the value of the potential is gradually and continuously being varied.

Although I have shown and described a specific embodiment of my invention, I am fully aware that many modifications thereof are possible. My invention, therefore, is not to be restricted except insofar as is necessitated by the prior art and by the spirit of the appended claims.

I claim as my invention:

1. For use in supplying power to a load from a source of periodically pulsating potential, the combination comprising an electric discharge valve of the immersed igniter type interposed between said source and said load, said valve including an anode, a cathode, an igniter and a control member, means for energizing said igniter momentarily at a preselected time during each positive pulsation, thereby tending to render said valve conductive at said preselected time, means for impressing a direct current biasing potential between said member and cathode of a substantially constant value to prevent said valve from becoming conductive, and means for changing said biasing potential throughout a predetermined number of said positive pulsations of said source to a second substantially constant value permitting said valve to be rendered conductive by said igniter energizing means.

2. For use in supplying power to a load from a source of alternating potential, the combination comprising an electric discharge valve of the immersed-igniter type interposed between said source and load, said valve including an anode, a cathode, an igniter and a control member, means including a peaking device and phase shifting means connected to said source for transmitting a current impulse having a peaked wave form through said igniter at a preselected time during each positive half-period of said source, thereby tending to render said valve conductive at said preselected time, means for impressing a direct-current biasing potential of substantially constant value between said member and cathode to prevent said valve from being rendered conductive by said impulses, and timing means in circuit with said source for changing said biasing potential throughout a predetermined number of periods of said source to a second substantially constant value permitting said valve to be rendered conductive by said impulses.

3. Apparatus for supplying power from a source of periodically pulsating current to a load comprising an ignitron having a plurality of principal electrodes, an igniter and a control electrode, interposed between said source and load, means for transmitting a current impulse having a peaked wave form through said igniter at a preselected time during each positive pulsation of said source tending to render said ignitron conductive at said preselected time only, means for impressing a potential between said control electrode and one of said principal electrodes normally tending to prevent said ignitron from being rendered conductive by said impulses and means for varying said potential to permit said ignitron to be rendered conductive in certain of said periods.

4. Apparatus for supplying power from a source of alternating current to a load comprising an ignitron having a plurality of principal electrodes, an igniter and a control electrode, interposed between said source and load, means including a peaking device and a phase shifting means connected to said source for transmitting a current impulse having a peaked wave form through said igniter at a preselected time during each positive pulsation of said source tending to render said ignitron conductive at said preselected time only, means for impressing a potential between said control electrode and one of said principal electrodes normally tending to prevent said ignitron from being rendered conductive by said impulses and means for varying said potential to permit said ignitron to be rendered conductive in certain of said periods.

5. For use in supplying power from a source of alternating potential to a load comprising a pair of inversely connected ignitrons interposed between said source and load, each ignitron having a pair of principal electrodes, an igniter and a control electrode, means for transmitting a current impulse having a peaked wave form through each igniter at a preselected time during each half period of said source which is positive with respect to the corresponding ignitron, thereby tending to render said corresponding ignitron conductive at said preselected time only, means for impressing a direct-current biasing potential of substantially constant value between the control electrode and one of said principal electrodes of each ignitron to prevent said ignitrons from being rendered conductive by said impulses and means for changing said biasing potential throughout a predetermined number of periods of said source to a second substantially constant value permitting said ignitrons to be rendered conductive by said igniter energizing means.

6. For use in supplying power from a source of alternating potential to a load comprising a pair of inversely connected ignitrons interposed between said source and load, each ignitron having a pair of principal electrodes, an igniter and a control electrode, means including a peaking device and a phase shifting means connected to said source for transmitting a current impulse having a peaked wave form through each igniter at a preselected time during each half period of said source which is positive with respect to the corresponding ignitron, thereby tending to render said corresponding ignitron conductive at said preselected time only, means for impressing a direct-current biasing potential of substantially constant value between the control electrode and one of said principal electrodes of each ignitron to prevent said ignitrons from being rendered conductive by said impulses and means for changing said biasing potential throughout a predetermined number of periods of said source to a second substantially constant value permitting said ignitrons to be rendered conductive by said igniter energizing means.

DEWEY D. KNOWLES.